US010900548B2

(12) United States Patent
Yoon (10) Patent No.: US 10,900,548 B2
(45) Date of Patent: Jan. 26, 2021

(54) LINEAR EXTENSION AND RETRACTION MECHANISM AND ROBOT ARM MECHANISM

(71) Applicant: LIFE ROBOTICS INC., Tokyo (JP)

(72) Inventor: Woo-Keun Yoon, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 156 days.

(21) Appl. No.: 16/145,862

(22) Filed: Sep. 28, 2018

(65) Prior Publication Data
US 2019/0032758 A1 Jan. 31, 2019

Related U.S. Application Data

(63) Continuation of application No. PCT/JP2017/012207, filed on Mar. 26, 2017.

(30) Foreign Application Priority Data

Mar. 29, 2016 (JP) .................................. 2016-066894

(51) Int. Cl.
| | | |
|---|---|---|
| *F16H 19/06* | (2006.01) | |
| *F16G 13/20* | (2006.01) | |
| *F16H 19/02* | (2006.01) | |
| *B25J 18/02* | (2006.01) | |

(Continued)

(52) U.S. Cl.
CPC ...... *F16H 19/0663* (2013.01); *B25J 17/0258* (2013.01); *B25J 18/02* (2013.01);
(Continued)

(58) Field of Classification Search
CPC ...... B25J 17/0258; B25J 18/02; B25J 19/025; B25J 18/06; F16G 13/06; F16G 13/20;
(Continued)

(56) References Cited

U.S. PATENT DOCUMENTS

| | | | | | |
|---|---|---|---|---|---|
| 304,625 | A | * | 9/1884 | Doubleday | ............. F16G 13/06 474/231 |
| 4,271,663 | A | * | 6/1981 | Templin | .................. F16G 13/06 474/207 |

(Continued)

FOREIGN PATENT DOCUMENTS

| | | |
|---|---|---|
| JP | H11-51124 A | 2/1999 |
| JP | 5435679 B2 | 3/2014 |
| WO | 2011/152265 A1 | 12/2011 |

OTHER PUBLICATIONS

International Search Report issued in PCT/JP2017/012207 dated Jun. 6, 2017 with English Translation (3 pages).

(Continued)

*Primary Examiner* — Joseph Brown
(74) *Attorney, Agent, or Firm* — Nakanishi IP Associates, LLC (57) ABSTRACT

A linear extension and retraction mechanism includes a plurality of first pieces shaped like a plate and coupled bendably with one another by first hinge sections, and a plurality of second pieces C-shaped or hollow square-shaped in transverse section. Each of the first hinge sections is made up of a shaft, columnar in shape, and bearing sections for the shaft, the bearing sections being provided on front and rear ends of each of the first pieces. A flange, non-circular in shape, is provided at a rear end of the shaft. A receiving section shaped as a recess and configured to accommodate a shape of the flange is provided in the bearing section at the front or rear end of the first piece. The flange is fitted in the receiving section.

6 Claims, 9 Drawing Sheets

(51) Int. Cl.
*F16G 13/06* (2006.01)
*F16G 13/07* (2006.01)
*B25J 17/02* (2006.01)

(52) U.S. Cl.
CPC ............ *B25J 18/025* (2013.01); *F16G 13/06* (2013.01); *F16G 13/07* (2013.01); *F16G 13/20* (2013.01); *F16H 19/02* (2013.01); *F16H 19/0636* (2013.01); *F16H 19/0645* (2013.01)

(58) Field of Classification Search
CPC .......... F16G 13/00; F16G 13/02; F16G 13/22; F16H 19/02; F16H 19/0636; F16H 19/0645; F16H 19/0663
USPC .................. 474/206, 220, 223, 224, 227
See application file for complete search history.

(56) References Cited

U.S. PATENT DOCUMENTS

| | | | | |
|---|---|---|---|---|
| 4,272,952 | A * | 6/1981 | Graham | F16G 13/06 474/207 |
| 6,364,799 | B1 * | 4/2002 | Campagnolo | F16G 13/06 474/206 |
| 2013/0068061 | A1 * | 3/2013 | Yoon | B25J 18/025 74/490.05 |
| 2015/0343648 | A1 | 12/2015 | Yoon | |

OTHER PUBLICATIONS

Written Opinion of International Searching Authority issued in PCT/JP2017/012207 dated Jun. 6, 2017 (4 pages).

* cited by examiner

LINEAR EXTENSION AND RETRACTION MECHANISM AND ROBOT ARM MECHANISM

CROSS-REFERENCE TO RELATED APPLICATIONS

This application is a continuation application of International Patent Application No. PCT/JP2017/012207 filed on Mar. 26, 2017, which is based upon and claims the benefit of priority from the prior Japanese Patent Application No. 2016-066894, filed Mar. 29, 2016 the entire contents of which are incorporated herein by reference.

FIELD

An embodiment described herein relates generally to a linear extension and retraction mechanism and a robot arm mechanism.

BACKGROUND

Recently, the possibility has been considered of situations where, besides nursing care robots, an industrial robot performs operations in the vicinity of a worker. If such a situation is realized, a handicapped person may be able to work in the same manner as a healthy person with the support of the robot, for example. A vertical articulated robot arm mechanism put to practical use by the inventors and provided with a linear extension and retraction mechanism has no elbow joint and thus no singular points. Consequently, there is no possibility of the robot arm mechanism suddenly moving in an unexpected direction at high speed, and the movement of an arm and an end effector can be predicted. Accordingly, the robot arm mechanism has extremely high safety, thus making a safety fence unnecessary and realizing collaborative work between a robot and a worker.

The linear extension and retraction mechanism includes a plurality of pieces shaped like flat plates and coupled together bendably by hinge sections, and a plurality of pieces formed into C-shaped grooves and similarly coupled together bendably on a bottom surface side by hinge sections. The two types of pieces are joined together by being pressed firmly against each other by a roller unit. Consequently, the two types of pieces are stiffened linearly, making up a columnar arm section having a certain degree of rigidity. Linear gears are provided on rear surfaces of the flat-plate pieces and meshed with a drive gear coupled to a motor. When the drive gear rotates forward, the arm section formed into a columnar body is sent forward from the roller unit, and when the drive gear rotates backward, the arm section is pulled backward. The two types of pieces are separated from each other behind the roller unit, being restored to a bent state. After being restored to a bent state, the two types of pieces are bent in a same direction and housed in a column. A wrist section is attached to a tip of the arm section. The wrist section is equipped with three joint sections provided with three orthogonal axes of rotation to change a posture of an end effector as desired.

In this way, one of vital components in the linear extension and retraction mechanism is a large number of pieces coupled together bendably and bending among the pieces is repeated along with extension and retraction of the arm section, and consequently, deformation of shafts and bearings of the hinge sections due to wear on the shafts and the bearings hinders smooth extension and retraction motion of the arm section. This results in a relatively high replacement frequency of the shafts and bearings of the hinge sections.

CITATION LIST

Patent Literature

[Patent Literature 1] Japanese Patent No. 5435679

SUMMARY OF INVENTION

Technical Problem

A purpose is to improve durability of a hinge section bendably coupling together a plurality of pieces making up a linear extension and retraction mechanism.

Solution to Problem

A linear extension and retraction mechanism according to the present embodiment includes: a plurality of first pieces shaped like a plate and coupled bendably with one another by first hinge sections; and a plurality of second pieces C-shaped or hollow square-shaped in transverse section and coupled bendably with one another on a bottom surface side by second hinge sections. The first pieces and the second pieces are formed into a columnar body stiffened by being restrained from bending when the first pieces are joined to the second pieces on a front surface side opposite the bottom surface side, and the first pieces and the second pieces return to a bent state when separated from each other. Each of the first hinge sections is made up of a shaft, columnar in shape, and bearing sections for the shaft, the bearing sections being provided on front and rear ends of each of the first pieces. A flange, non-circular in shape, is provided at a rear end of the shaft. A receiving section shaped as a recess and configured to accommodate a shape of the flange is provided in the bearing section at the front or rear end of the first piece. The flange is fitted in the receiving section.

DETAILED DESCRIPTION

A linear extension and retraction mechanism according to the present embodiment is described below with reference to drawings. Note that the linear extension and retraction mechanism according to the present embodiment can be used as an independent mechanism (joint). Hereinafter, a robot arm mechanism in which one of a plurality of joint sections is made up of the linear extension and retraction mechanism according to the present embodiment is described as an example. A vertical articulated robot arm mechanism provided with the linear extension and retraction mechanism is described herein as an example of the robot arm mechanism, but the robot arm mechanism may be of another type. In the following description, components having substantially same functions and configurations are denoted by the same reference numerals, and redundant description thereof will be omitted unless necessary.

Figure 1:
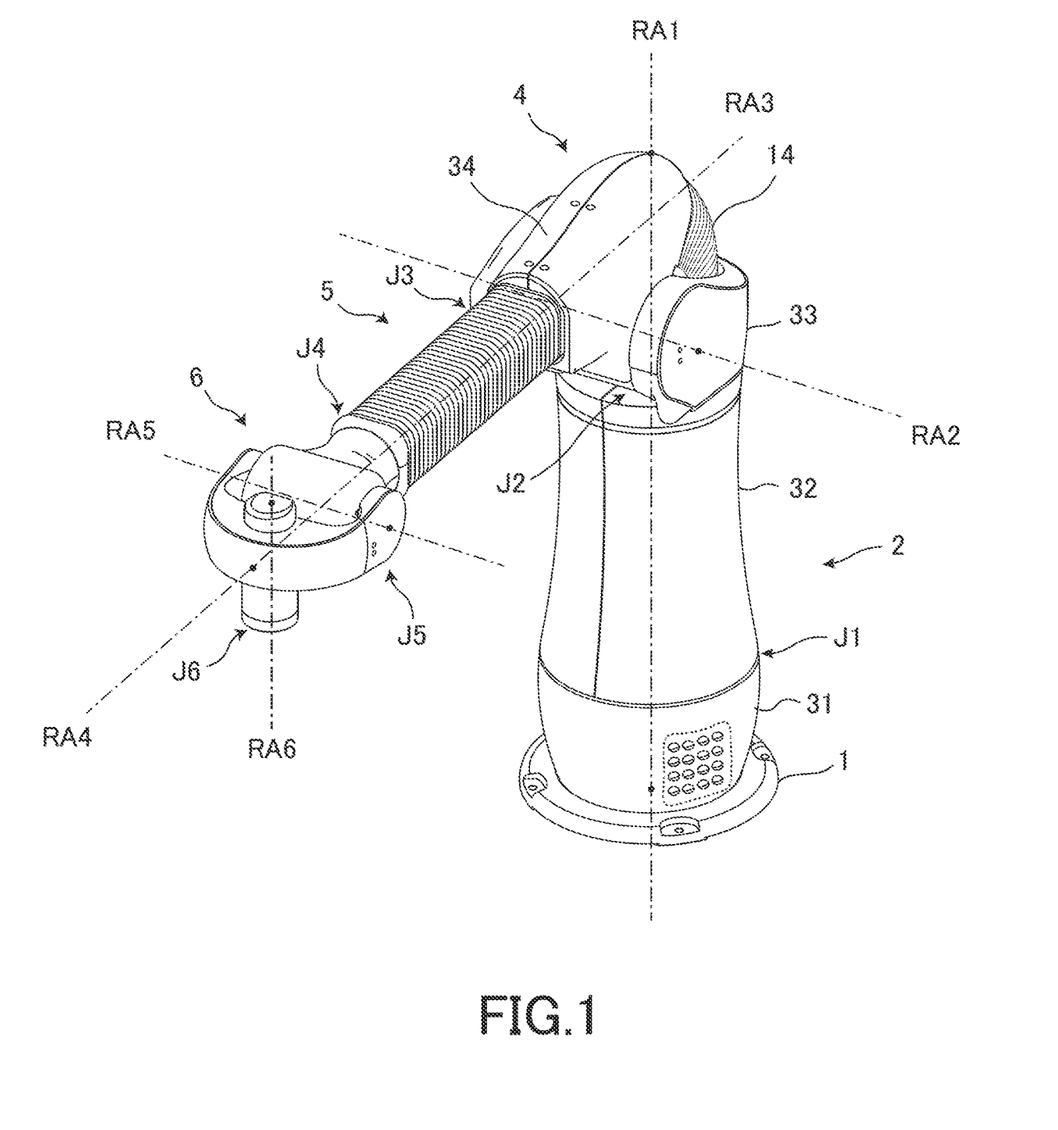
FIG. 1 is a perspective view illustrating an external appearance of a robot arm mechanism provided with a linear extension and retraction mechanism according the present embodiment.
Figure 2:
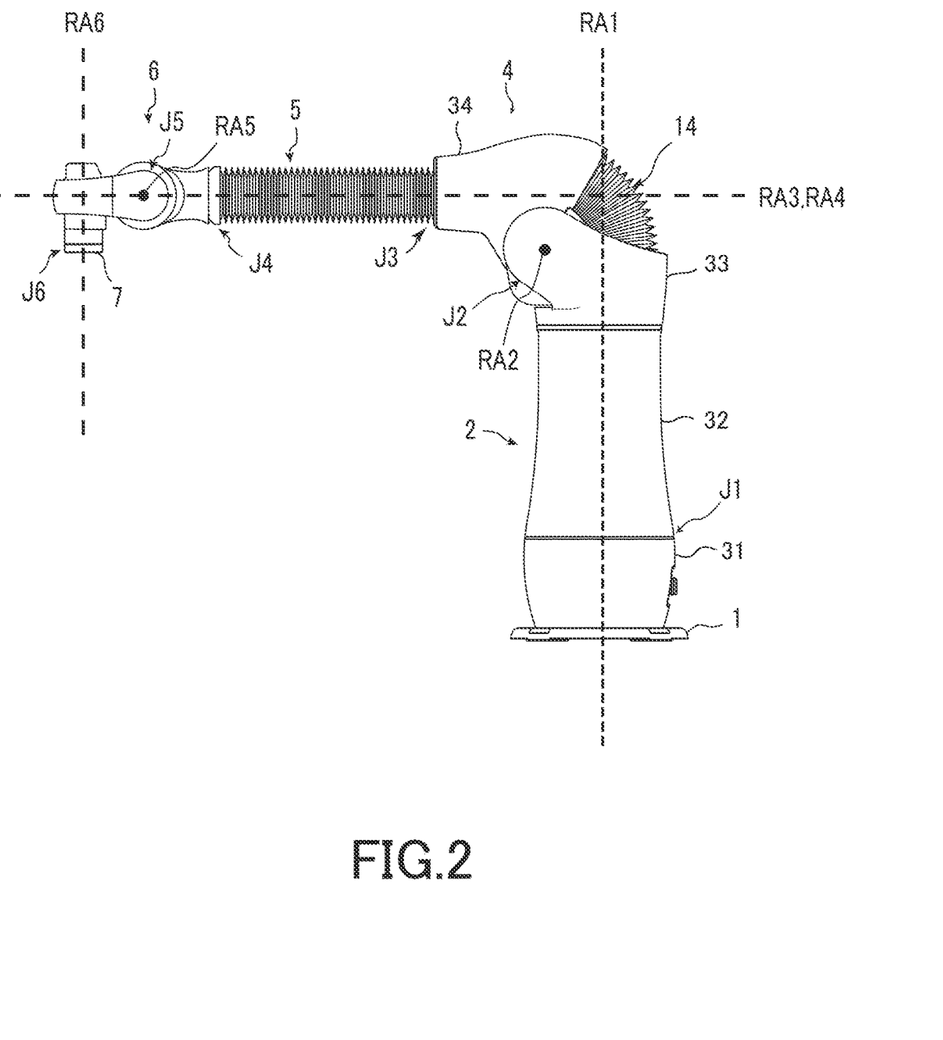
FIG. 2 is a side view of the robot arm mechanism of FIG. 1.
Figure 3:
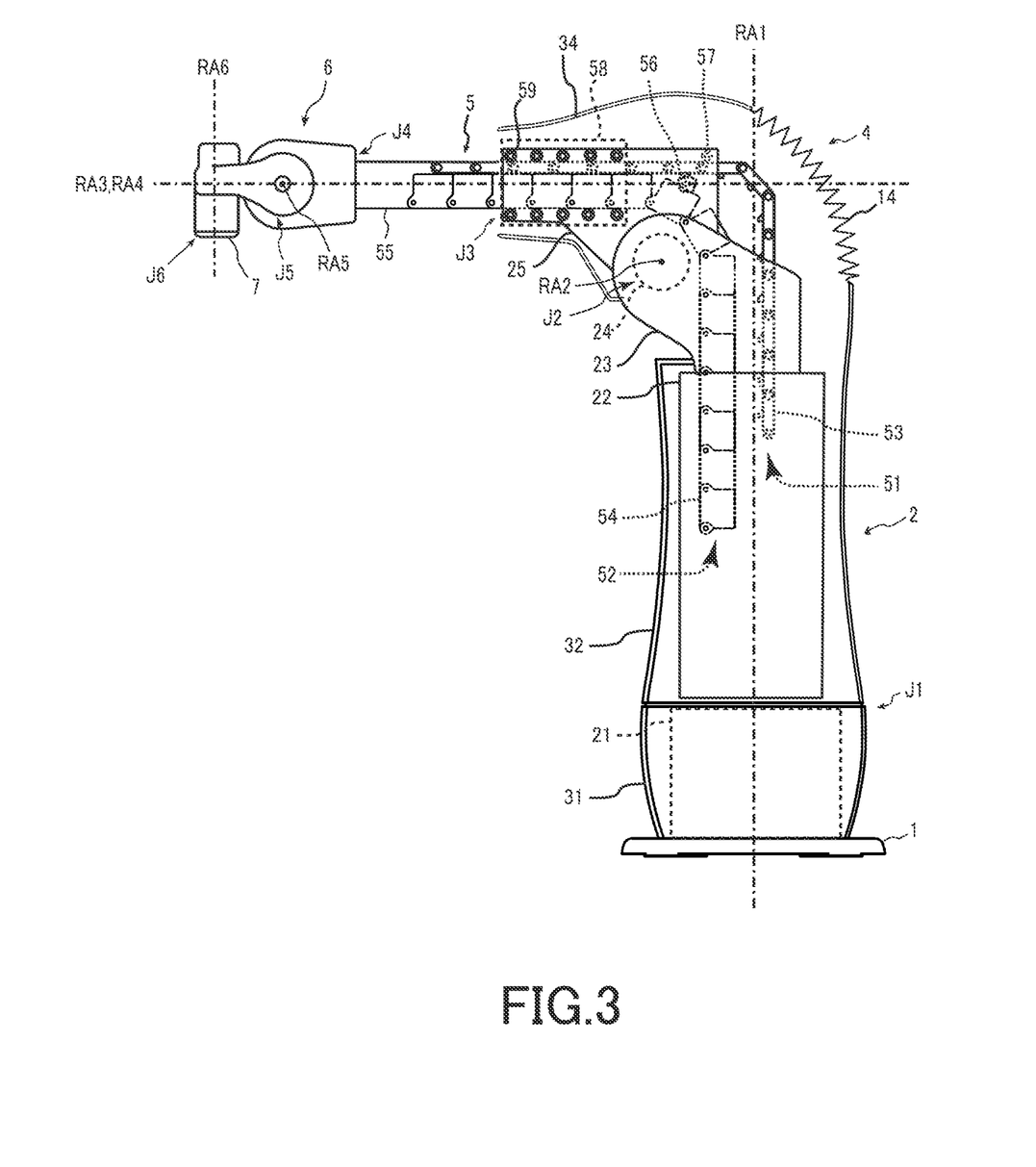
FIG. 3 is a side view illustrating an internal structure of the robot arm mechanism of FIG. 1.

FIG. 1 illustrates an external appearance of a robot arm mechanism provided with the linear extension and retraction mechanism according the present embodiment. FIG. 2 is a side view of the robot arm mechanism of FIG. 1. FIG. 3 is a side view illustrating an internal structure of the robot arm mechanism of FIG. 1.

The robot arm mechanism includes a base 1, a turning section 2, an upwardly-and-downwardly moving section 4, an arm section 5, and a wrist section 6. The turning section 2, the upwardly-and-downwardly moving section 4, the arm section 5, and the wrist section 6 are arranged in order from the base 1. A plurality of joint sections J1, J2, J3, J4, J5, and J6 are arranged in order from the base 1. The turning section 2 forming a cylindrical body is installed typically vertically on the base 1. The turning section 2 houses the first joint section J1 serving as a turn rotation joint section. The first joint section J1 has a torsional rotation axis RA1. The axis of rotation RA1 is parallel to a vertical direction. The turning section (column) 2 includes a lower frame 21 and an upper frame 22. The lower frame 21 is connected at one end with a fixed section of the first joint section J1. The lower frame 21 is connected at another end to the base 1. The lower frame 21 is covered by a housing 31 having a cylindrical shape. The upper frame 22 is connected to a rotating section of the first joint section 41, and axially rotates about the axis of rotation RA1. The upper frame 22 is covered by a housing 32 having a cylindrical shape. Along with the rotation of the first joint section 41, the upper frame 22 rotates with respect to the lower frame 21, thereby causing the arm section 5 to sweep horizontally. First and second piece strings 51 and 52 of the third joint section J3 are stored in an inner space of the turning section 2 forming a cylindrical body, where the first and second piece strings 51 and 52 serve as a linear extension and retraction mechanism described later.

The upwardly-and-downwardly moving section 4 adapted to house the second joint section J2 serving as a swivel joint section is installed on upper part the turning section 2. The second joint section J2 is a bending rotation joint. An axis of rotation RA2 of the second joint section J2 is perpendicular to the axis of rotation RA1. The upwardly-and-downwardly moving section 4 has a pair of side frames 23 as fixing sections (support sections) for the second joint section 42. The pair of side frames 23 are coupled to the upper frame 22. The pair of side frames 23 are covered by a cover 33 shaped like a saddle. A cylindrical body 24 serving as a rotating section of the second joint section J2 that combines a motor housing is supported by the pair of side frames 23. A delivery mechanism 25 is attached to a circumferential surface of the cylindrical body 24. The delivery mechanism 25 is covered by a cover 34, cylindrical in shape. A gap between the saddle-shaped cover 33 and the cylindrical cover 34 is covered by a U-shaped bellows cover 14, U-shaped in cross section. The U-shaped bellows cover 14 extends and retracts by following up-and-down pivot motion of the second joint section 42.

The delivery mechanism 25 holds a drive gear 56, a guide roller 57, and a roller unit 58. Along with axial rotation of the cylindrical body 24, the delivery mechanism 25 turns, and the arm section 5 supported by the delivery mechanism 25 pivots up and down.

The third joint section J3 is provided by the linear extension and retraction mechanism. The linear extension and retraction mechanism has a structure newly developed by the inventors and is clearly distinguished from a conventional, so-called linear motion joint in terms of the range of movement. The arm section 5 of the third joint section J3 is bendable, but when the arm section 5 is sent forward along a center axis (center axis of extension and retraction RA3) from the delivery mechanism 25 at the root of the arm section 5, bending is limited and linear rigidity is ensured. When pulled backward, the arm section 5 recovers bendability. The arm section 5 includes the first piece string 51 and second piece string 52. The first piece string 51 is made up of a plurality of first pieces 53 coupled together bendably. The first piece 53 is configured into a substantially flat-plate shape. The first pieces 53 are bendably coupled together at ends by first hinge sections 300. The second piece string 52 is made up of a plurality of second pieces 54. The second piece 54 is configured into a trough-like body C-shaped in transverse section or a tubular body hollow square-shaped in transverse section. The second pieces 54 are bendably coupled together by second hinge sections 400 at ends of bottom plates. The bending of the second piece string 52 is limited at a position where end faces of side plates of the second pieces 54 abut each other. At this position the second piece string 52 is arranged linearly. Details of the first and second hinge sections 300 and 400 will be described later. A leading first piece 53 of the first piece string 51 and a leading second piece 54 of the second piece string 52 are connected with each other by a head piece 55. For example, the head piece 55 has a combined shape of the first piece 53 and the second piece 54.

When passing through the roller unit 58 of the delivery mechanism 25, the first and second piece strings 51 and 52 are joined together by being pressed against, each other by rollers 59. As a result, of the joining, the first and second piece strings 51 and 52 exhibit linear rigidity, forming the arm section 5, columnar in shape. The drive gear 56 is provided behind the roller unit 58 together with the guide roller 57. The drive gear 56 is connected to a non-illustrated motor unit. The motor unit generates power to rotate the drive gear 56. On a surface on an inner side of the first piece 53, i.e., at a center in a width direction of the surface on the side on which the first piece 53 is joined to the second piece 54, a linear gear 539 is formed along a coupling direction. When the plurality of first pieces 53 are lined up linearly, the successive linear gears 539 are connected linearly, making up a long linear gear. The drive gear 56 is meshed with the linear gears 539 of the first pieces 53 pressed by the guide roller 57. The linearly connected linear gears 539 make up a rack-and-pinion mechanism in conjunction with the drive gear 56. When the drive gear 56 rotates forward, the first and second piece strings 51 and 52 are sent forward from the roller unit 58. When the drive gear 56 rotates backward, the first and second piece strings 51 and 52 are pulled backward of the roller unit 58. When pulled back, the first and second piece strings 51 and 52 are separated from each other at a location between the roller unit. 58 and the drive gear 56. The separated first and second piece strings 51 and 52 are returned to a bendable state. After returning to a bendable state, the first and second piece strings 51 and 52 bend in a same direction (inward) and are stored vertically in the turning section 2. In so doing, the first piece string 51 is stored by being almost aligned substantially parallel to the second piece string 52.

A wrist section 6 is attached to a tip of the arm section 5. The wrist section 6 is equipped with the fourth to sixth joint sections 44 to J6. The fourth to sixth joint sections J4 to J6 have respective axes of rotation RA4 to RA6, which make up three orthogonal axes. The fourth joint section J4 is a torsional rotation joint around the fourth axis of rotation RA4, which substantially coincides with the center axis of extension and retraction RA3, and the end effector swings along with rotation of the fourth joint section J4. The fifth joint section J5 is a bending rotation joint around the fifth axis of rotation RA5 placed perpendicularly to the fourth axis of rotation RA4, and the end effector rotates to tilt back and forth along with rotation of the fifth joint section J5. The sixth joint section J6 is a torsional rotation joint around the sixth axis of rotation RA6 placed perpendicularly to the fourth axis of rotation RA4 and fifth axis of rotation RA5, and the end effector rotates axially along with rotation of the sixth joint section J6.

The end effector is attached to an adapter 7 provided in lower part of a rotating section of the sixth joint section J6 of the wrist section 6. The end effector is that part of the robot which has a function to work directly on a workpiece, and various tools, such as a gripping section, a vacuum suction section, a nut fastening tool, a welding gun, and a spray gun, are available for the end effector according to tasks. The end effector is moved to any desired position by the first, second, and third joint sections J1, J2, and J3, and placed in any desired posture by the fourth, fifth, and sixth joint sections J4, J5, and J6. In particular, length of an extension and retraction distance of the arm section 5 of the third joint section J3 allows the end effector to reach an object in a wide range from a position close to the base 1 to a position far from the base 1. The third joint section J3 is distinguished from the conventional linear motion joint by the linear extension and retraction motion realized by the linear extension and retraction mechanism of the third joint section J3 and the length of the extension and retraction distance.

Figure 4:
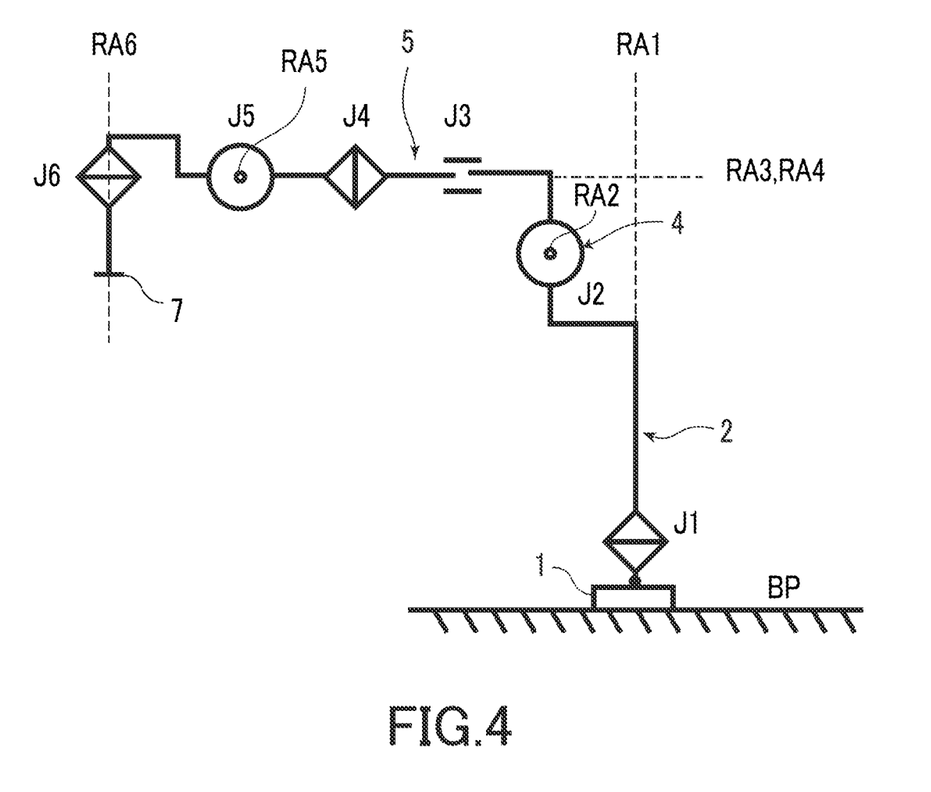
FIG. 4 is a diagram illustrating a configuration of the robot arm mechanism of FIG. 1 using symbolic description.

FIG. 4 illustrates a configuration of the robot arm mechanism using symbolic description. In the robot arm mechanism, three positional degrees of freedom are realized by the first joint section J1, second joint section J2, and third joint section J3 making up three root axes. Also, three postural degrees of freedom are realized by the fourth joint section J4, fifth joint section J5, and sixth joint section J6 making up three wrist axes. As illustrated in FIG. 4, the axis of rotation RA1 of the first joint section J1 is oriented in a vertical direction. The axis of rotation RA2 of the second joint section J2 is oriented in a horizontal direction. The second joint section J2 is offset from the first joint section J1 in two directions: a direction of the axis of rotation RA1 and a direction of an axis orthogonal to the axis of rotation RA1. The axis of rotation RA2 of the second joint section J2 does not intersect the axis of rotation RA1 of the first joint section J1. The axis of movement RA3 of the third joint section J3 is oriented in a direction perpendicular to the axis of rotation RA2. The third joint section J3 is offset from the second joint section J2 in two directions: the direction of the axis of rotation RA1 and a direction of an axis orthogonal to the axis of rotation RA1. The axis of rotation RA3 of the third joint section J3 does not intersect the axis of rotation RA2 of the second joint section J2. Since one bending joint section of the three root axes of the plurality of joint sections J1 to J6 is replaced with a linear extension and retraction joint section J3 and the second joint section J2 is offset from the first joint, section J1 in two directions and the third joint, section J3 is offset from the second joint section J2 in two directions, the robot arm mechanism of a robot device according to the present embodiment structurally eliminates singular postures.

Figure 5A:
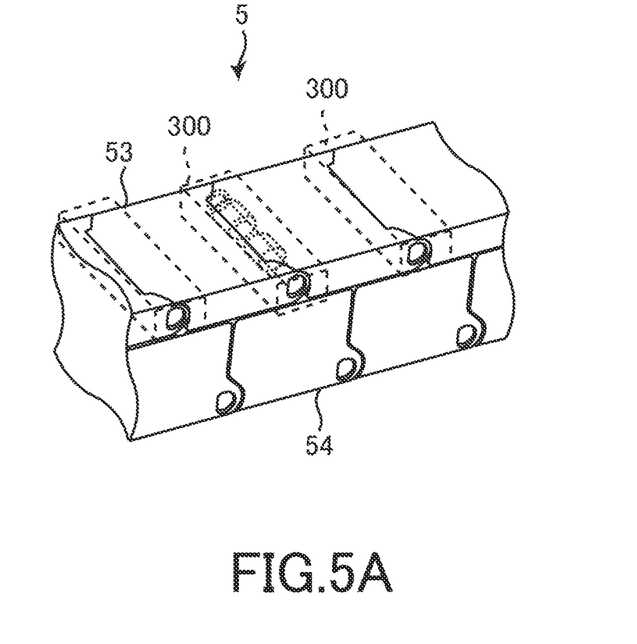
FIGS. 5A and 5B are diagrams illustrating an arm section of FIG. 3.
Figure 5B:
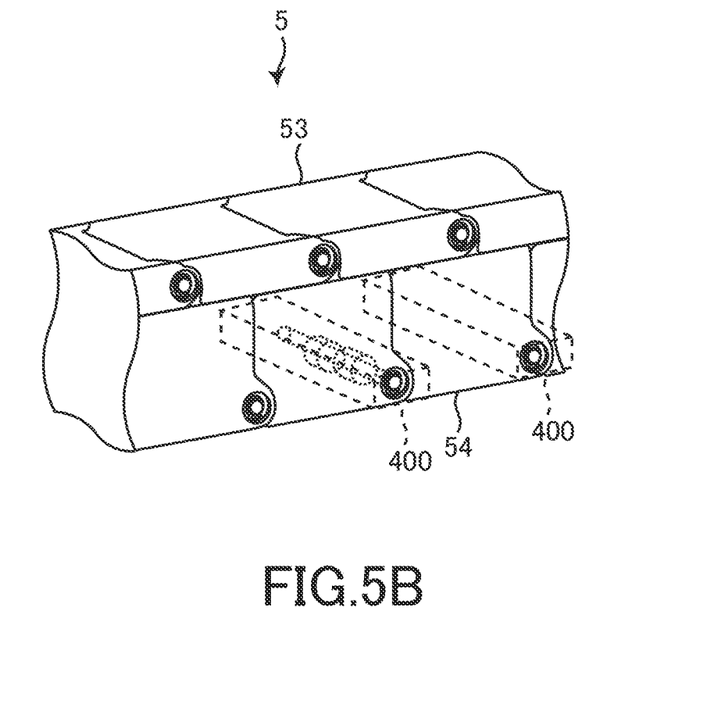
Figure 6A:
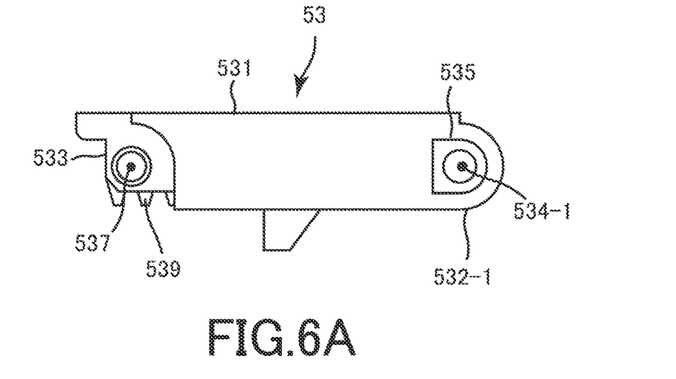
FIGS. 6A, 6B, and 6C are diagrams illustrating a structure of a first piece of FIG. 5.
Figure 6B:
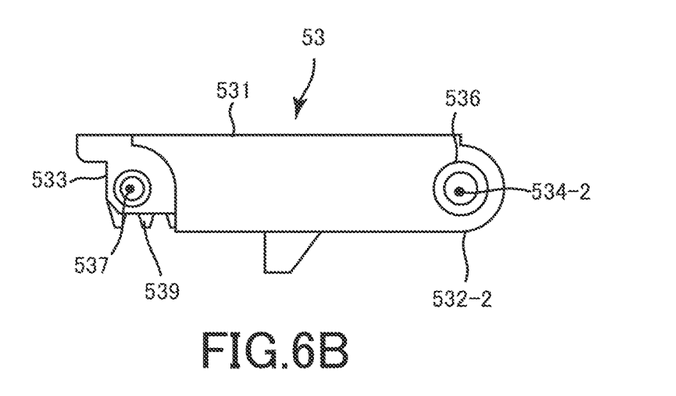
Figure 6C:
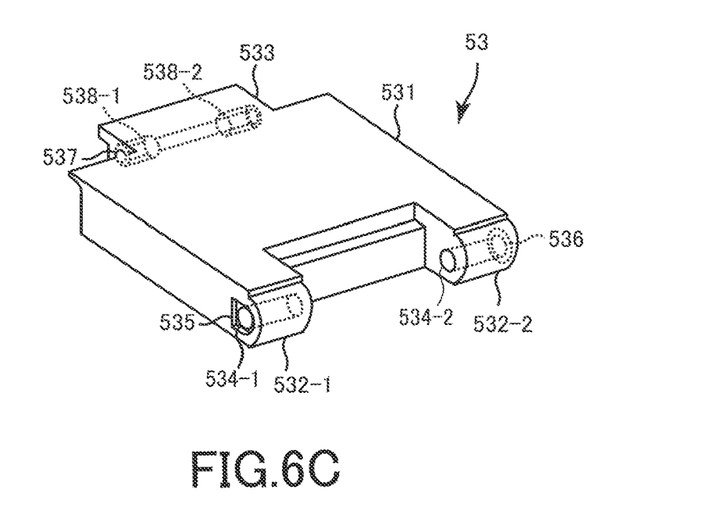
Figure 7A:
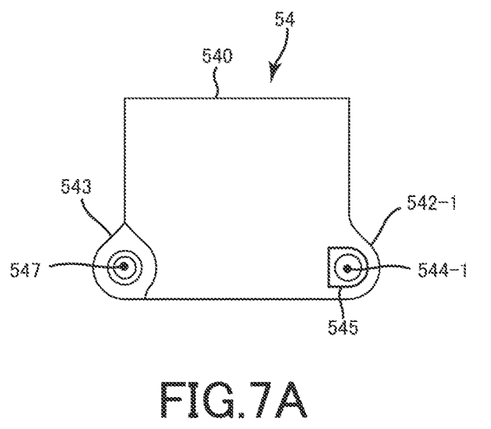
FIGS. 7A, 7B, 7C, and 7D are diagrams illustrating a structure of a second piece of FIG. 5.
Figure 7B:
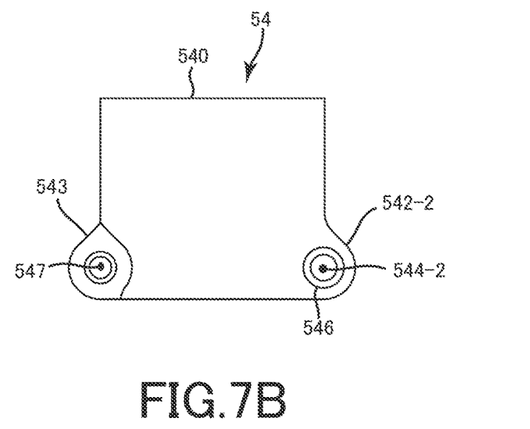
Figure 7C:
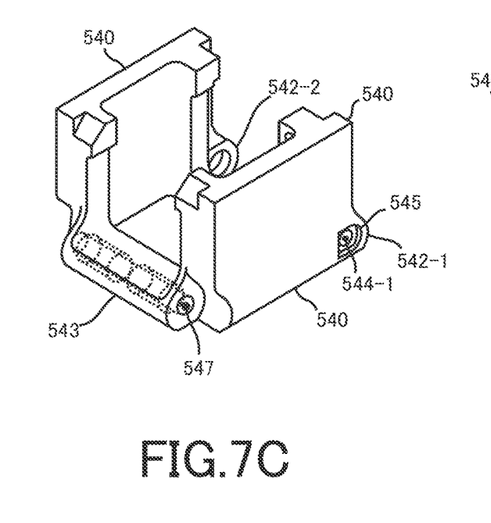
Figure 7D:
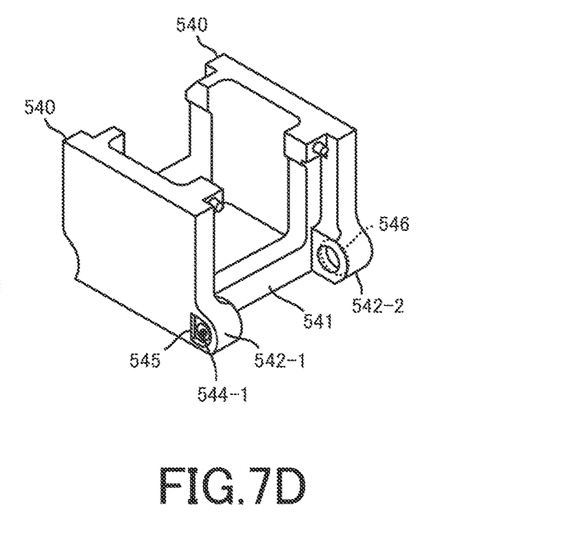
Figure 8:
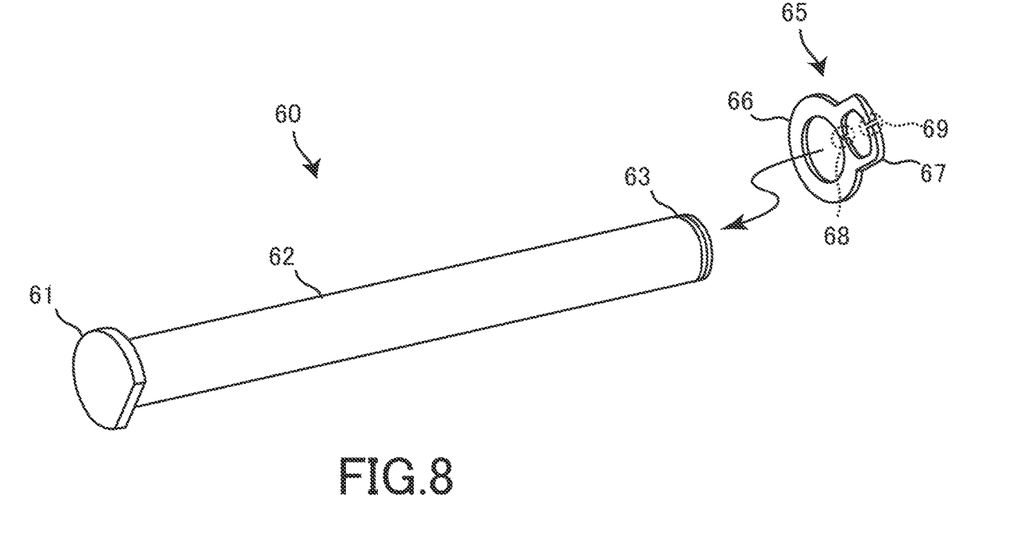
FIG. 8 is a diagram illustrating a shaft, of FIGS. 5A and 5B together with a restrainer ring.
Figure 9:
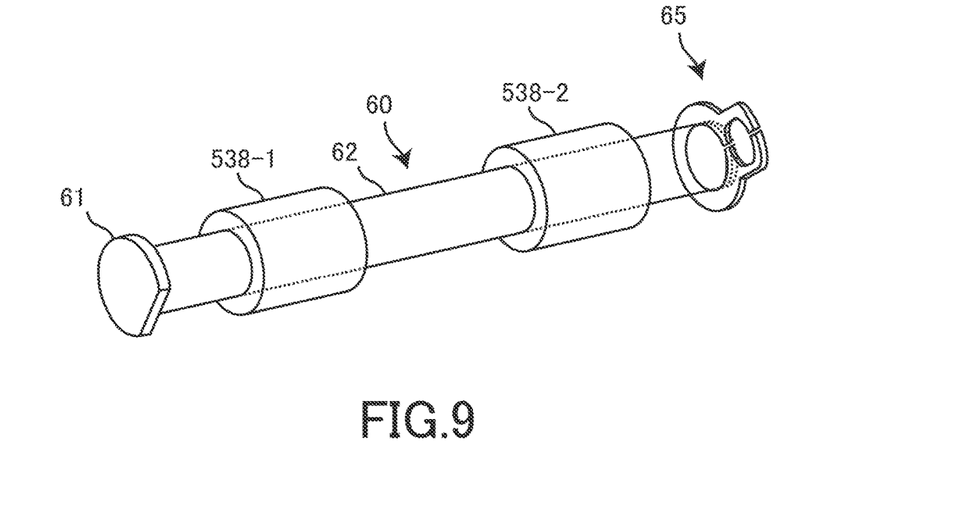
FIG. 9 is a diagram illustrating how the restrainer ring is fitted in a groove at a tip of the shaft of FIG. 8.

FIGS. 5A and 5B are diagrams illustrating an arm section 5 of FIG. 3. FIG. 5A illustrates a left side face of the arm section 5 and FIG. 5B illustrates a right side face of the arm section 5. FIGS. 6A to 6C are diagrams illustrating a structure of the first piece 53 of FIG. 5. FIGS. 7A to 7D are diagrams illustrating a structure of the second piece 54 of FIG. 5. FIG. 8 is a diagram illustrating a shaft. 60 of FIGS. 5A and 5B together with a restrainer ring 65. FIG. 9 is a diagram illustrating how the restrainer ring 65 is fitted in a groove 63 at a tip of the shaft 60 of FIG. 8.

(First Piece 53)

As illustrated in FIG. 5, each pair of preceding and following first pieces 53 are coupled together bendably by a first hinge section 300 in end portions. The first hinge section 300 includes the shaft. 60, a bearing section at a rear end of the first piece 53, and a front end bearing section at a front end of the first piece 53.

As illustrated in FIGS. 6A to 6C, the first piece 53 is substantially a flat-plate body as a whole. The first piece 53 includes a piece main body 531 shaped as a rectangular flat plate. As the front end bearing section adapted to receive the shaft 60, a pair of support blocks 532-1 and 532-2 are provided here on opposite sides on a front end of the piece main body 531 by projecting forward. The pair of support blocks 532-1 and 532-2 are penetrated by a pair of shaft, holes 534-1 and 534-2 extending in parallel to a width direction of the first piece 53. The pair of shaft holes 534-1 and 534-2 have a diameter equal to or slightly larger than inside diameters of bearings 538-1 and 538-2 described later. Opposite end portions of the shaft holes 534-1 and 534-2 are expanded from the shaft hole diameter, forming recesses of a predetermined depth. One of the recesses is a flange receiving section 535 adapted to receive a flange 61 of the shaft 60 described later. The flange receiving section 535 is shaped to accommodate a shape of the flange 61 at a rear end of the shaft. Here, in a lateral surface of the support block 532-1, as the flange receiving section 535, a recess D-shaped in cross section and having a depth equivalent to thickness of the flange 61 is formed around the shaft hole 534-1. The other recess is a ring housing 536 adapted to house the restrainer ring 65 to be fitted in the groove 63 at the tip of the shaft 60 described later. Here, as the ring housing 536, a recess circular in cross section and deeper than thickness of the restrainer ring 65 is formed around the shaft hole 534-2.

As a bearing section into which the shaft 60 is inserted, a bearing block 533 is provided in a center on a rear end of the piece main body 531, projecting rearward. The bearing block 533 is also penetrated by a shaft hole 537 extending in parallel to the width direction of the first piece 53. One or more bearings 538, two bearings 538-1 and 538-2 in this case, are provided in the shaft, hole 537. The bearings 538-1 and 538-2 can be rolling bearings such as ball bearings or roller bearings, or cylindrical sliding bearings made of a self-lubricating resin such as polyacetal (POM) polyamide (PA), or polytetrafluoroethylene (PTFE, fluorine resin).

FIG. 8 illustrates the shaft 60. The shaft 60 is a shaft body 62 columnar in shape and having a diameter substantially equal to the inside diameters of the bearings 538-1 and 538-2. Length of the shaft 60 from a rear end to a front end is substantially equal to or slightly shorter than width of the first piece 53. The flange 61 is provided at a rear end of the shaft body 62, projecting outward in a radial direction of the shaft body 62. In planar shape, the flange 61 is non-circular, and D-shaped in this case. In a tip portion of the shaft body 62, the groove 63, annular in shape, is cut perpendicularly to a center axis of the shaft body 62. The restrainer ring 65 is fitted in the groove 63. Axial movement of the shaft 60 is restrained by the restrainer ring 65, thereby preventing the shaft. 60 from falling off. The restrainer ring 65 is made of a hard resin or a soft resin such as silicone rubber. A knob 67 is added to a ring portion 66 of the restrainer ring 65. The ring portion 66 is an annular body whose inside diameter is shorter than a diameter of the shaft body 62 and equal to an inside diameter of a bottom of the groove 63. The knob 67 is provided on the ring portion 66, projecting outward in a radial direction of the ring portion 66. A linear cut 68 is provided in the ring portion 66, extending from an inner circumferential surface to an outer circumferential surface along the radial direction. A cut. 69 is provided in the knob 67 in line with the cut 68 in the ring portion 66. With the inside diameter of the ring portion 66 temporarily expanded by elastically deforming the ring portion 66 using the cuts 68 and 69, the restrainer ring 65 is fitted in the groove 63 in the shaft 60. Note that if the restrainer ring 65 is made of a soft resin, the cut 68 may be unnecessary.

The bearing block 533 on the rear end of the first piece 53 is inserted between the pair of support blocks 532-1 and 532-2 on the front end of another first, piece 53. The pair of shaft holes 534-1 and 534-2 are communicated with the shaft hole 537. The shaft 60 is inserted into the communicated through-holes. The flange 61 at the rear end of the shaft 60 is fitted into the flange receiving section 535 of the support block 532-1. The flange 61 has a flat D-shape, and the flange receiving section 535 is a D-shaped recess configured to accommodate the flat D-shape of the flange 61. The restrainer ring 65 is fitted into the groove 63 at the tip of the shaft 60. Each pair of preceding and following first pieces 53 are coupled together bendably around an axis of the shaft 60. Forward movement of the shaft 60 is restrained as the flange receiving section 535 of the first piece 53 receives the flange 61 of the shaft 60. Also, rearward movement of the shaft. 60 is restrained as the ring housing 536 receives the restrainer ring 65 fitted in the groove 63 in the shaft 60. Furthermore, since the shaft. 60 includes the flange 61, D-shaped in cross section, and the flange 61 is fitted into the flange receiving section 535 configured to accommodate the shape of the flange 61, the shaft 60 does not rotate relative to the shaft holes 534-1 and 534-2 provided with the flange receiving section 535 and located in the support blocks 532-1 and 532-2 on the front end of the first piece 53. On the other hand, the shaft 60 rotates relative to the bearings 538-1 and 538-2 that make up the shaft hole 537 in the bearing block 533 in the center on the rear end of the piece main body 531. This greatly limits wear on the shaft. 60 caused by repeated bending of the first piece 53.

(Second Piece 54)

The second pieces 54 are bendably coupled together by second hinge sections 400 at ends of bottom plates. The second hinge section 400 is identical in structure to the first hinge section 300 of the first piece 53. Specifically, as illustrated in FIG. 7, a bearing section is provided in a center in the width direction on the rear end of the bottom plate of the second piece 54, and a pair of bearing sections are provided by being spaced away to opposite sides of a front end of the bottom plate. The bearing section at the rear end is fitted between the pair of bearing sections at the front end. Shaft holes are formed in these bearing sections, being communicated with one another. A shaft 70 is inserted into the communicated shaft holes. Consequently, bendability of the second pieces 54 is realized.

As shown in FIG. 7, the second piece 54 is a trough-like body C-shaped (saddle-shaped) in cross section or a tubular body hollow square-shaped in cross section as a whole. A main body includes a bottom plate 541 and a pair of side plates 540 rising perpendicularly from opposite sides of the bottom plate 541. On opposite sides on a front end of the bottom plate 541, as bearing sections equipped with shaft holes 544-1 and 544-2 into which the shaft 70 is to be inserted, a pair of support blocks 542-1 and 542-2 are provided by projecting forward. The pair of shaft holes 544-1 and 544-2 have a diameter equal to or slightly larger than inside diameters of bearings 548-1 and 548-2 described later. In an outer end surface of one support block 542-1, a flange receiving section 545 is provided as a recess into which a flange 71 of the shaft 70 is to be fitted. An inner shape of the flange receiving section 545 accommodates to an outer shape of the flange 71 at, a rear end of the shaft. Here, the flange receiving section 545 of the support block 542-1 is D-shaped to accommodate the D-shape of the flange 71 at the rear end of the shaft. In a center on a rear end of the bottom plate 541, as a bearing section equipped with a shaft hole 547 into which the shaft 70 is to be inserted, a bearing block 543 is provided by projecting rearward. The bearing block 543 is also penetrated by a shaft hole 547 extending in parallel to the width direction of the second piece 54. One or more bearings, two bearings 548-1 and 548-2 in this case, are provided in the shaft hole 547. The bearings 548-1 and 548-2 can be ball bearings or roller bearings.

The bearing block 543 on the rear end of the second piece 54 is fitted between the pair of support, blocks 542-1 and 542-2 on the front end of another second piece 54. In this state, the shaft holes 544-1 and 544-2 are communicated with the shaft, hole 547. The shaft. 70 is inserted into the communicated through-holes. The flange 71 at the rear end of the shaft 70 is fitted into the flange receiving section 545 of the support block 542-1. The shaft 70 does not rotate relative to the shaft holes 544-1 and 544-2 in the support, blocks 542-1 and 542-2. The shaft. 70 rotates relative to the shaft, hole 547 in the bearing block 543 on the rear end. Consequently, each pair of preceding and following second pieces 54 are coupled together bendably around an axis of the shaft 70. Forward movement of the shaft. 70 is restrained as the flange 71 of the shaft 70 interferes with the flange receiving section 545 of the second piece 54. Also, rearward movement of the shaft is restrained as a restrainer ring 75 interferes with a ring housing 546.

With the structure of the first hinge section 300 described above, when the preceding and following first pieces 53 bend, the shaft 60 rotates relative to the bearing block 533 on the rear end via the bearings 538-1 and 538-2, but does not rotate relative to the support blocks 532-1 and 532-2 on the front end. Also, the axial movement of the shaft. 60 is restricted by the flange 61 and the restrainer ring 65. This makes it possible to decrease the number of bearings and reduce man-hours needed to install the bearings compared to a structure in which bearings are used in all the shaft holes as well as to reduce wear on the shaft 60 and improve durability performance. Besides, wear on inner surfaces of the pair of shaft, holes 534-1 and 534-2 adapted to receive the shaft. 60 can be limited, thereby improving durability performance of the first, pieces 53. Note that the second hinge section 400 achieves the same effects as the first hinge section 300 described above.

Figure 10A:
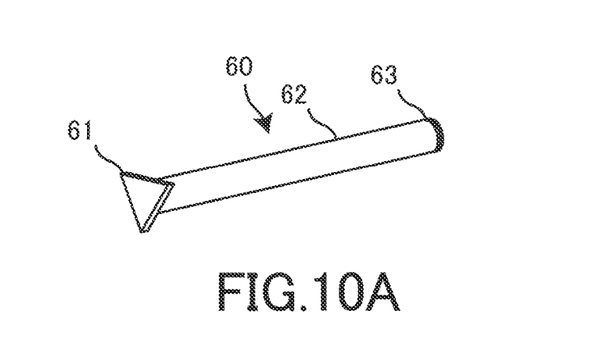
FIGS. 10A, 10B, 10C, 10D, and 10E are diagrams illustrating other examples of the shaft of FIG. 8.
Figure 10B:
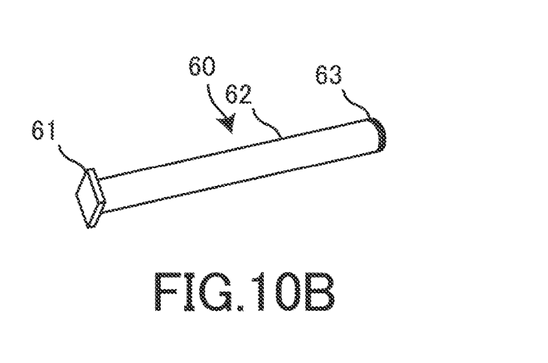
Figure 10C:
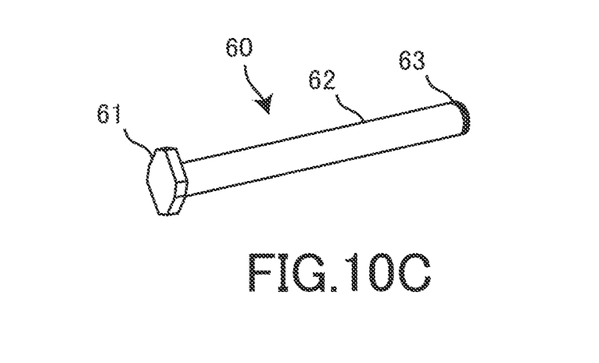
Figure 10D:
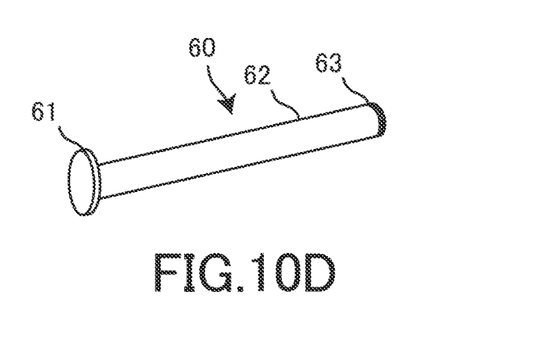
Figure 10E:
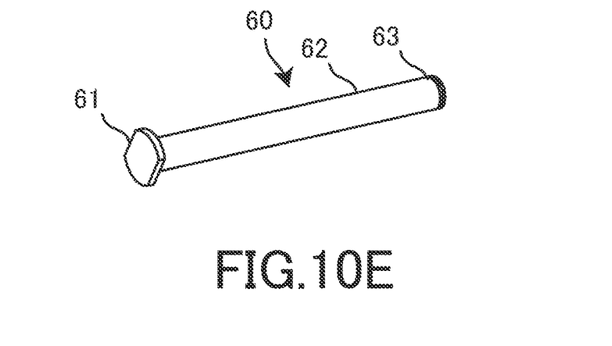

The flange 61 of the shaft 60 is not limited to a D-shape, and may have another shape as long as the shape is non-circular. The flange 61 at the rear end of the shaft 60 may be polygonal such as plane triangular, square, or hexagonal as illustrated in FIG. 10A, FIG. 10B, and FIG. 10C. Also, as illustrated in FIG. 10D, the flange 61 of the shaft 60 may be elliptical. Furthermore, as illustrated in FIG. 10E, the flange 61 of the shaft. 60 may have a cross-sectional shape formed by a combination of straight lines and curves.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

53 . . . first piece, 531 . . . piece main body, 60 . . . shaft, 61 . . . D-shaped flange, 62 . . . shaft body, 63 . . . groove, 65 . . . restrainer ring, 300 . . . first hinge section, 532-1, 532-2 . . . support, block, 534-1, 534-2 . . . shaft, hole, 538-1, 538-2 . . . bearing, 535 . . . flange receiving section, 536 . . . ring housing.

The invention claimed is:

1. A linear extension and retraction mechanism comprising:
  a plurality of first pieces shaped like a plate and coupled bendably with one another by first hinge sections; and
  a plurality of second pieces C-shaped or U-shaped in transverse section and coupled bendably with one another on a bottom surface side by second hinge sections, where when the first pieces are joined to the second pieces on a front top surface side opposite the bottom surface side, the first pieces and the second pieces are formed into a columnar body stiffened by being restrained from bending and the first pieces and the second pieces return to a bent state when separated from each other,
  wherein each of the first hinge sections is made up of a shaft, columnar in shape, and bearing sections for the shaft, the bearing sections being provided on front and rear ends of each of the first pieces,
  a flange, non-circular in shape, is provided at a rear end of the shaft,
  a receiving section shaped as a recess formed on a side face of each of the first pieces and configured to accommodate the shape of the flange is provided in the bearing section at the front or rear end of the first piece, and the flange is fitted in the receiving section,
  the flange receiving section has a depth equivalent to a thickness of the flange and
  a length of the shaft from the rear end to a front end is substantially equal to or shorter than a width of the first piece, such that the side face of the first piece with the flange fitted in the receiving section comprises no protrusion over a whole area from the front end to the rear end of the first piece.

2. The linear extension and retraction mechanism according to claim 1, wherein the flange has a D-shape, polygonal shape, oval shape, or elliptical shape.

3. The linear extension and retraction mechanism according to claim 1, wherein an annular groove is formed in an outer circumference of a tip of the shaft, and a restrainer ring is fitted in the annular groove to restrain axial movement of the shaft.

4. A linear extension and retraction mechanism comprising:
  a plurality of first pieces shaped like a plate and coupled bendably with one another by first hinge sections; and
  a plurality of second pieces C-shaped or U-Shaped in transverse section and coupled bendably with one another on a bottom surface side by second hinge sections, where when the first pieces are joined to the second pieces on a front top surface side opposite the bottom surface side, the first pieces and the second pieces are formed into a columnar body stiffened by being restrained from bending and the first pieces and the second pieces return to a bent state when separated from each other,
  wherein each of the second hinge sections is made up of a shaft, columnar in shape, and bearing sections for the shaft, the bearing sections being provided on front and rear ends of a bottom plate of each of the second pieces,
  a flange, non-circular in shape, is provided at a rear end of the shaft,
  a receiving section shaped as a recess formed on a side face of each of the second pieces and configured to accommodate the shape of the flange is provided in the bearing section at the front or rear end of the second piece, and the flange is fitted in the receiving section,
  the flange receiving section has a depth equivalent to a thickness of the flange and
  a length of the shaft from the rear end to a front end is substantially equal to or shorter than a width of the second piece, such that the side face of the second piece with the flange fitted in the receiving section comprises no protrusion over a whole area from the front end to the rear end of the second piece.

5. A robot arm mechanism, in which a column equipped with a turn rotation joint section is supported on a base, an upwardly-and-downwardly moving section equipped with a swivel joint section is placed on the column, a linear extension and retraction mechanism equipped with an arm section configured to be linearly extendible and retractable is provided on the upwardly-and-downwardly moving section, the arm section is equipped at a tip with a wrist section fittable with an end effector, and the wrist section is equipped with at least one rotation joint section for changing a posture of the end effector, wherein:
  the linear extension and retraction mechanism includes:
    a plurality of first pieces shaped like a plate and coupled bendably with one another by first hinge sections, and
    a plurality of second pieces C-shaped or U-shaped in transverse section and coupled bendably with one another on a bottom surface side by second hinge sections, where when the first pieces are joined to the second pieces on a front top surface side opposite the bottom surface side, the first pieces and the second pieces are formed into a columnar body stiffened by being restrained from bending and the first pieces and the second pieces return to a bent state when separated from each other, each of the first hinge sections is made up of a shaft, columnar in shape, and bearing sections for the shaft, the bearing sections being provided on front and rear ends of each of the first pieces, a flange, non-circular in shape, is provided at a rear end of the shaft, a receiving section shaped as a recess formed on a side face of each of the first pieces and configured to accommodate the shape of the flange is provided in the bearing section at the front or rear end of the first piece, and the flange is fitted in the receiving section, the flange receiving section has a depth equivalent to a thickness of the flange and a length of the shaft from the rear end to a front end is substantially equal to or shorter than a width of the first piece, such that the side face of the first piece with the flange fitted in the receiving section comprises no protrusion over a whole area from the front end to the rear end of the first piece.

6. A robot arm mechanism, in which a column equipped with a turn rotation joint section is supported on a base, a upwardly-and-downwardly moving section equipped with a swivel joint section is placed on the column, a linear extension and retraction mechanism equipped with an arm section configured to be linearly extendible and retractable is provided on the upwardly-and-downwardly moving section, the arm section is equipped at a tip with a wrist section fittable with an end effector, and the wrist section is equipped with at least one rotation joint section for changing a posture of the end effector, wherein:

the linear extension and retraction mechanism includes:
a plurality of first pieces shaped like a plate and coupled bendably with one another by first hinge sections, and a plurality of second pieces C-shaped or U-shaped in transverse section and coupled bendably with one another on a bottom surface side by second hinge sections, where when the first pieces are joined to the second pieces on a front top surface side opposite the bottom surface side, the first pieces and the second pieces are formed into a columnar body stiffened by being restrained from bending and the first pieces and the second pieces return to a bent state when separated from each other, each of the second hinge sections is made up of a shaft, columnar in shape, and bearing sections for the shaft, the bearing sections being provided on front and rear ends of a bottom plate of each of the second pieces, a flange, non-circular in shape, is provided at a rear end of the shaft, a receiving section shaped as a recess formed on a side face of each of the second pieces and configured to accommodate the shape of the flange is provided in the bearing section at the front or rear end of the second piece, and the flange is fitted in the receiving section, the flange receiving section has a depth equivalent to a thickness of the flange and a length of the shaft from the rear end to a front end is substantially equal to or shorter than a width of the second piece, such that the side face of the second piece with the flange fitted in the receiving section comprises no protrusion over a whole area from the front end to the rear end of the second piece.

\* \* \* \* \*